United States Patent
Gross et al.

[11] Patent Number: 5,181,957
[45] Date of Patent: Jan. 26, 1993

[54] DUST CONTROL AND ORE HANDLING AID FOR BAUXITE ORE

[75] Inventors: Anthony E. Gross, St. Charles; Nancy L. Passantino, LaGrange Park, both of Ill.

[73] Assignee: Nalco Chemical Company, Naperville, Ill.

[21] Appl. No.: 732,850

[22] Filed: Jul. 19, 1991

[51] Int. Cl.$^5$ ............................................. C09K 3/22
[52] U.S. Cl. .................................... 75/772; 252/319; 252/382
[58] Field of Search ................... 252/382, 319; 75/746, 75/772

[56] References Cited

FOREIGN PATENT DOCUMENTS 47587  4/1977  Japan ................................. 252/382

*Primary Examiner*—Melvyn J. Andrews
*Attorney, Agent, or Firm*—Robert A. Miller; Joseph B. Barrett

[57] ABSTRACT

The invention provides a method for the suppression of bauxite dust emissions from dry, finely divided bauxite ore. The method includes the step of contacting bauxite ore with an aqueous solution of a water-soluble vinyl addition polymer. The polymer being selected from the group consisting of non-ionic and anionic water-soluble vinyl addition polymers.

3 Claims, No Drawings

DUST CONTROL AND ORE HANDLING AID FOR BAUXITE ORE

BACKGROUND OF THE INVENTION

1. Field of the Invention

The present invention is directed to ore handling, and more particularly, to the handling of bauxite ore.

2. Description of the Prior Art

Dusting is a common problem in the mining, storage, and transportation of bauxite ore. For example, in transit, when pulverized bauxite ore is loaded into ships, barges or railroad cars, material is lost by wind erosion or dusting. This bauxite dust is an air pollutant which is possibly hazardous to the environment.

The usual method for reducing bauxite ore dust is to contact the bauxite with a water spray or a water spray including surfactants. The spray is applied via a pressurized spray system or gravity fed. The problem with using a simple water spray or a water spray including surfactants is that bauxite ore is very hydrophilic and becomes tacky and difficult to handle when wet. This tackiness causes the ore to stick to transfer belts and makes it difficult to remove from shipping vehicles, i.e. ships, barges. Thus, water sprays or water sprays including surfactants are not acceptable solutions to the bauxite ore problem since they cause the ore to become tacky and difficult to handle. Accordingly, it would be advantageous to provide an improved method and composition for controlling dusting conditions during the handling of bauxite ore.

SUMMARY OF THE INVENTION

One aspect of the present invention is directed to a method for the suppression of bauxite dust emissions from dry, finely divided bauxite ore. The method includes the step of contacting the bauxite ore with an aqueous solution of a water-soluble vinyl addition polymer selected from the group consisting of nonionic and anionic water-soluble vinyl addition polymers. According to one preferred embodiment of the invention, the bauxite ore is contacted with 0.0001-0.5 pounds of the water-soluble vinyl addition polymer per ton of bauxite. Preferred water-soluble vinyl addition polymer includes polyacrylamide, polyacrylic acid and its water-soluble alkali metal salts, acrylamide-acrylate copolymers, and acrylamide-acrylamido methyl propane sulfonic acid copolymer.

DESCRIPTION OF THE PREFERRED EMBODIMENTS

The present invention provides aqueous solutions of water-soluble, vinyl addition polymers which are sprayed onto bauxite ores to agglomerate the fines to prevent dusting. According to one embodiment of the invention, the bauxite ore is contacted with from about 0.0001-0.5 pounds of polymer per ton of ore. It should be noted that the upper limit of this range represents only an economical application level and that amounts above this will work but will be excessively costly. The dosage of the polymer will also vary depending on the severity of the dusting problems encountered. Tests of the invention demonstrate that treated ore does not become tacky and is easily handled even though the level of residual water in the ore would be expected to cause the ore to be tacky. Without intending to limit the invention, it is believed that the polymers bind a sufficient quantity of the water such that the water cannot be absorbed by the ore.

The polymers of the present invention are water-soluble, vinyl addition polymers. These polymers are well known to the art and have been described in numerous publications and patents. The water-soluble vinyl addition polymers of the present invention are anionic and, in some instances, the ionic charges are sufficiently slight so that the polymers may be considered noniomic. For example, polymers such as polyvinyl alcohol are noniomic, and polymers such as polyacrylic acid or acrylamidomethylpropane sulfonic acid containing polymers are anionic. All of these polymers may be used in the practice of the invention. The polymers preferred in the practice of the invention are acrylamide polymers which are commonly used in many industrial applications. Preferred acrylamide polymers include polyacrylamide and its water-soluble copolymeric derivatives such as, for instance, acrylamide-acrylic acid, and acrylamide-acrylic acid salt copolymers which contain from about 50-95 mole precent of acyrlamide. It is preferred in the practice of this invention to use acrylamide copolymers which are water-soluble and which contain at least 50 mole percent of acrylamide.

The molecular weight of the polymers described above may vary over a wide range, e.g.: 1,000,000-15,000,000. The invention, however, finds its greatest usefulness in preparing aqueous solutions or dispersions of these polymers and, in particular, acrylamide polymers whose molecular weight are less than about 15,000,000. Polymers having higher molecular weights are more difficulty dissolved in water and tend to form extremely viscous solutions at relatively low concentrations. However, these polymers are still useful in the practice of the invention. The polymers of the invention may be produced by any known methods of conducting polymerization reactions. Thus, solution suspension or emulsion polymerization techniques may be used. The polymers of the invention are most conveniently employed in the practice of the invention in the form of concentrated water and oil emulsions. Water and oil emulsions of water-soluble vinyl polymers are well known and are described in Vanderhoff U.S. Pat. No. 3,284,393 and Anderson-Frisque U.S. Pat. No. Re. 28,474, the disclosures of these patents are incorporated herein by reference.

In the Anderson-Frisque patent, it is disclosed that when the water and oil emulsions which contain the polymers are added to waters which contain water-soluble surfactants rapid dissolution of the polymers is achieved. This rapid dissolution technique is well suited for preparing treating solutions which contain the high molecular weight polymers of the invention.

According to one embodiment of the invention, the water-soluble vinyl addition polymers are prepared as oil and water emulsions having polymer concentrations within the range of about 20-40 percent by weight. More preferably, the polymer concentration is 25-35 percent by weight. The aqueous solutions of the invention are prepared from the oil and water emulsions described above. The aqueous solution include from about 0.0005 to about 0.5 percent by weight oil and water emulsion. More preferably, the aqueous solutions include 0.01 to 0.2 percent by weight oil and water emulsion. According to one embodiment of the invention, an emulsion is not used and dry polymer is added directly to water.

Water-soluble non-ionic monomers useful in the practice of the invention include acrylamide, N-substituted derivatives of acrylamide, hydroxyalky acrylates, hydroxyalky methacrylates, and N-vinyl formamide. Anionic monomers useful in the practice of the invention include the water-soluble ammonium and alkali metal salts of acrylic acid, methacrylic acid, ethacrylic acid, and 2-acrylamido-2-methyl propane sulfonic acid. In a preferred embodiment of this invention the nonionic monomers are acrylamide, N-N-dimethylacrylamide and 2-hydroxyethyl methacrylate, but the most preferred one is acrylamide. The preferred anionic monomers are the sodium salt of acrylic acid, methacrylic acid and 2-acrylamido-2-methyl propane sulfonic acid, and the most preferred one is the sodium salt of acrylic acid.

The following examples are presented to describe preferred embodiments and utilities of the invention and are not meant to limit the present invention unless otherwise stated in the claims appended hereto.

EXAMPLE 1

A. Treatment of Ore

Examples 2-5 were performed according to the following procedures. One thousand grams of ore having a residual water level of about 16% was placed in a rotating disc agglomerator. Water or an aqueous solution including 0.1% by weight of an oil and water emulsion of the vinyl addition polymers of the invention was sprayed onto the tumbling ore. In a plant operation, the treatment would, most likely, be sprayed onto the ore at belt transfer points or into a rotating drum. In the following examples, when the ore became tacky, it was evidenced by the ore sticking to and buildup on the rotating disc. This is similar to the problem of sticking to transfer belts in plant operations. After treatment, the ore was removed from the disc and either stored in a closed container for future dust testing or immediately placed in the dust box and evaluated. The tackiness of the treated ore was subjectively determined according to the criteria listed in Table 1 below.

TABLE 1

| | Measurement of Tackiness | |
|---|---|---|
| Scale | Description | Estimated Plant Operation |
| 5 | extreme sticking to disc | could not run in plant |
| 4 | sticking to treatment disc | could not run in plant |
| 3 | less sticking to treatment disc | could not run in plant |
| 2 | less sticking to treatment disc | can run in plant |
| 1 | slight sticking to treatment disc | can run in plant |

TABLE 1-continued

| | Measurement of Tackiness | |
|---|---|---|
| Scale | Description | Estimated Plant Operation |
| 0 | dry ore | can run in plant |

B. Drop Box Test for Dust

Before each test, the drop box was cleaned to remove all dust. One thousand grams of bauxite ore having a moisture level of about 16% was placed in a top compartment of the dust box. Below the top compartment are trap doors, which when opened, cause the ore to fall into a bottom compartment. A preweighed clean slide tray was positioned in a lower opening of the drop box so that it could be readily inserted. To conduct a trial, the trap doors of the top compartment of the drop box were opened causing the ore sample to fall to the bottom of the box, thereby causing dust to form throughout the chamber. After five seconds, the slide tray is inserted. The tray remains in place for five minutes to allow the dust to settle onto it. The slide tray is removed and weighed. The percent residual dust is calculated using the formula below.

$$\% \text{ Residual dust} = \frac{\text{Weight of dust of treated sample}}{\text{Weight of dust of untreated ore sample}} \times 100$$

EXAMPLE 2

The polymers or copolymers evaluated in Examples 2-4 are listed below in Table 2.

TABLE 2

| | Polymer Composition | Wt. % Actives | Molecular Weight |
|---|---|---|---|
| Latex Polymer | | | |
| A | Acrylamide/Na acrylate, 93.8/6.2 | 28-29 | 5-10,000,000 |
| B | Acrylamide 100% | 26.5 | 5-10,000,000 |
| C | Na acrylate, 100% | 28-29 | 5-10,000,000 |
| D | Acrylamide/Na acrylamido-methylpropane sulfonic acid 89/11 | 28-29 | 5-10,000,000 |
| E | Acrylamide/NH$_4$ acrylate 65/35 | 39 | 5-10,000,000 |
| F | Acrylamide/Na acrylate 69/31 | 28-29 | 5-10,000,000 |
| G | Crosslinked polyacrylamide | 28 | >>10,000,000 |
| H | Acrylamide/Na acrylate 69/31 | 31 | 1-5,000,000 |
| I | Acrylamide/Na acrylate 69/31 | 34-34 | 10-15,000,000 |
| Dry Polymer | | | |
| J | Acrylamide/Na Acrylate 60/31 | 100 | 5-10,000,000 |

*Ratios are mole percent

In Example 2, the treated ore was stored twenty-four hours prior to the dust test. The residual moisture (moisture prior to treatment) of the ore was 15.9%. An additional 2.5% water was added through the treatment of the ore. As shown in table 3, the ore treated with only water was unacceptably tacky, while the ore treated with the polymer-water solution remained relatively non-tacky. Moreover, the ore treated with polymer-water solutions showed a 67-80% reduction in dusting over untreated samples and a 5-18% reduction in dusting over water alone.

TABLE 3

| Treatment | *Dose (lb/ton) | Added H$_2$O (%) | Residual Dust (%) | Tackiness Measurement |
|---|---|---|---|---|
| Blank | — | — | 100 | 0 |
| Water | — | 2.5 | 45 | 3 |
| Blank | — | — | 100 | 0 |

TABLE 3-continued

| Treatment | *Dose (lb/ton) | Added H₂O (%) | Residual Dust (%) | Tackiness Measurement |
|---|---|---|---|---|
| Water | — | 2.5 | 38 | 3 |
| A | .05 | 2.5 | 27 | 1 |
| B | .05 | 2.5 | 23 | 1 |
| C | .05 | 2.5 | 20 | 1 |
| D | .05 | 2.5 | 28 | 1 |
| E | .038 | 2.5 | 33 | 1 |
| F | 0.005 | 2.5 | 28 | 1 |
| F | 0.05 | 2.5 | 19 | 1 |

*Dose = lb/ton of oil and water emulsion including polymer

EXAMPLE 3

In Example 3, the treated ore was stored twenty-four hours prior to the dust test. The residual moisture (moisture prior to treatment) of the ore was 16.5%. An additional 2.5–5.0% water was added through the treatment of the ore. As shown in table 4, the ore treated only with water was unacceptably tacky, while the ore treated with the polymer-water solution remained non-tacky. Moreover, the ore treated with polymer-water solutions showed a 67–100% reduction in dusting over untreated samples and a 30–44% reduction in dusting over water alone. In fact, at the dose of 0.05 lb/ton of emulsion including polymer F, dusting was completely eliminated.

TABLE 4

| Treatment | Dose (lb/ton) | Added H₂O (%) | Residual Dust (%) | Tackiness Measurement |
|---|---|---|---|---|
| Blank | — | — | 100 | 0 |
| Water | — | 2.5 | 63 | 4 |
| Water | — | 5.0 | 44 | 5 |
| F | .05 | 2.5 | 33 | 1 |
| F | .05 | 5.0 | 0 | 2 |
| G | .05 | 2.5 | 56 | 1 |
| G | .05 | 5.0 | 8 | 2 |

EXAMPLE 4

In Example 4, the treated ore was tested immediately. The residual moisture (moisture prior to treatment) of the ore was 16.5%. An additional 2.5–3.75% water was added through the treatment of the ore. As shown in table 5, the ore treated only with water was again unacceptably tacky. The ore treated with the polymer-water solution remained non-tacky. The ore treated with polymer-water solutions showed a 97–100% reduction in dusting over untreated samples, and a 4–12% reduction in dusting over water alone. Several of the treatments of the invention prevented dusting entirely.

TABLE 5

| Treatment | Dose (lb/ton) | Added H₂O (%) | Storage Time of Treated Ore (hrs) | Residual Dust (%) | Tackiness Measurement |
|---|---|---|---|---|---|
| Blank | — | — | — | 100 | 0 |
| Water | — | 2.5 | 24 | 12 | 4 |
| Water | — | 3.75 | 24 | 4 | 5 |
| H | .05 | 3.75 | 24 | 3 | 2 |
| H | .10 | 3.75 | 24 | 0 | 1 |
| I | .05 | 3.75 | 24 | 2 | 2 |
| I | .10 | 3.75 | 24 | 0 | 1 |
| F | .05 | 3.75 | 24 | 0 | 1 |
| F | .05 | 2.5 | 24 | 1 | 1 |
| Water | — | 2.5 | 0 | 2 | 4 |
| Water | — | 3.75 | 0 | 1 | 5 |
| F | .05 | 2.5 | 0 | 0 | 1 |
| F | .05 | 3.75 | 0 | 0 | 1 |

EXAMPLE 5

Example 5 demonstrates the usefulness of dry polymer added directly to water, without using latex in an oil and water emulsion. In Example 5, the treated ore was tested immediately. The residual moisture (moisture prior to treatment) of the ore was 16.5%. An additional 2.5% water was added through the treatment of the ore. As shown in table 6, the ore treated only with water was unacceptably tacky. The ore treated with the polymer-water solution remained non-tacky. The ore treated with polymer-water solutions showed a 93% reduction in dusting over untreated samples, and was comparable to water alone.

TABLE 6

| Treatment | *Dose (lb/ton) | Added H₂O (%) | Residual Dust (%) | Tackiness Measurement |
|---|---|---|---|---|
| Blank | — | — | 100 | 0 |
| Water | — | 2.5 | 0 | 3 |
| J | 0.014 | 2.5 | 9 | 1 |

*Active polymer

We claim:

1. A method for the suppression of bauxite dust emissions from dry, finely divided bauxite ore which comprises contacting such bauxite ore with an aqueous solution of a water-soluble vinyl addition polymer selected from the group consisting of nonionic and anionic water-soluble vinyl addition polymers.

2. The method of claim 1 where the bauxite ore is contacted with 0.0001–0.5 pounds of the water-soluble vinyl addition polymer per ton of bauxite.

3. The method of claim 1 where the water-soluble vinyl addition polymer is selected from the group consisting of polyacrylamide, polyacrylic acid pand its water-soluble alkali metal salts, acrylamide-acrylate copolymers, and acrylamide-acrylamido methyl propane sulfonic acid copolymer.

* * * * *